July 30, 1929.　　　J. WEGNER　　　1,722,724

MACHINE FOR TREATING STONE

Filed March 26, 1927　　　2 Sheets-Sheet 1

INVENTOR
JULIUS WEGNER

BY Lotka, Kehlenbeck & Farley
ATTORNEYS

July 30, 1929.  J. WEGNER  1,722,724.
MACHINE FOR TREATING STONE
Filed March 26, 1927  2 Sheets-Sheet 2
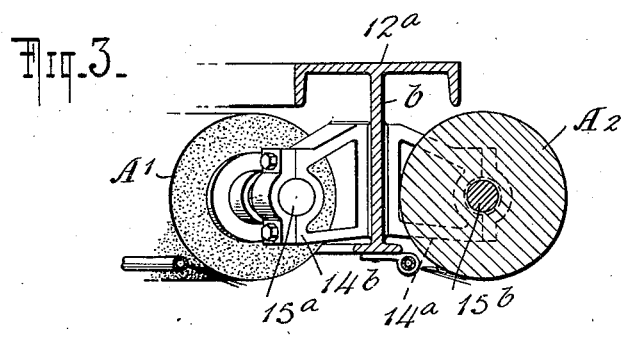
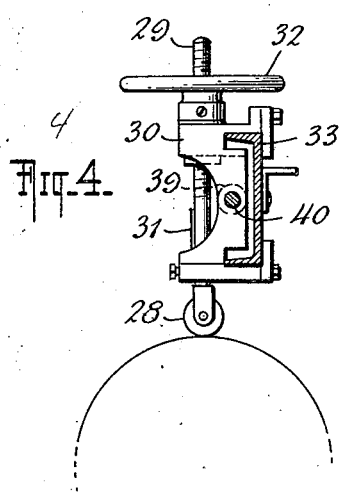
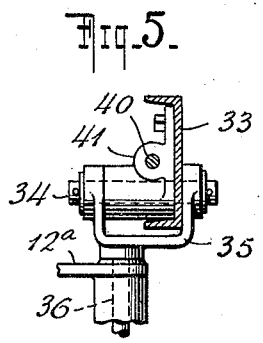
INVENTOR
JULIUS WEGNER Patented July 30, 1929.

1,722,724

UNITED STATES PATENT OFFICE.

JULIUS WEGNER, OF NEW YORK, N. Y.

MACHINE FOR TREATING STONE.

Application filed March 26, 1927. Serial No. 178,552.

My invention relates to machines for treating stone and more particularly to machines of the type commonly referred to as grinding or rubbing machines whereby the surfaces of stone slabs, blocks and the like are dressed. Such machines generally include a travelling table for the stone and a rotatable grinding member in operative relation thereto, the latter revolving about an axis at right angles to the direction of travel of the table and being composed of a number of abrasive cylinders or disks mounted upon a common spindle or shaft and together constituting the grinding member. In practice it often happens that a small piece of material or pieces of hard substance gets in between the grinding member and the surface of the stone being treated. When this occurs, such substance eventually grinds one or more grooves in the grinding member and accordingly produces corresponding ridges on the surface of said stone. As a result the surface of the stone slab or block is not properly dressed, but presents correspondingly uneven and other undesirable characteristics. The object of the present invention is to overcome these disadvantages and to provide a machine constructed and arranged to properly and evenly grind or rub the surface of the stone at all times.

Figure 1:
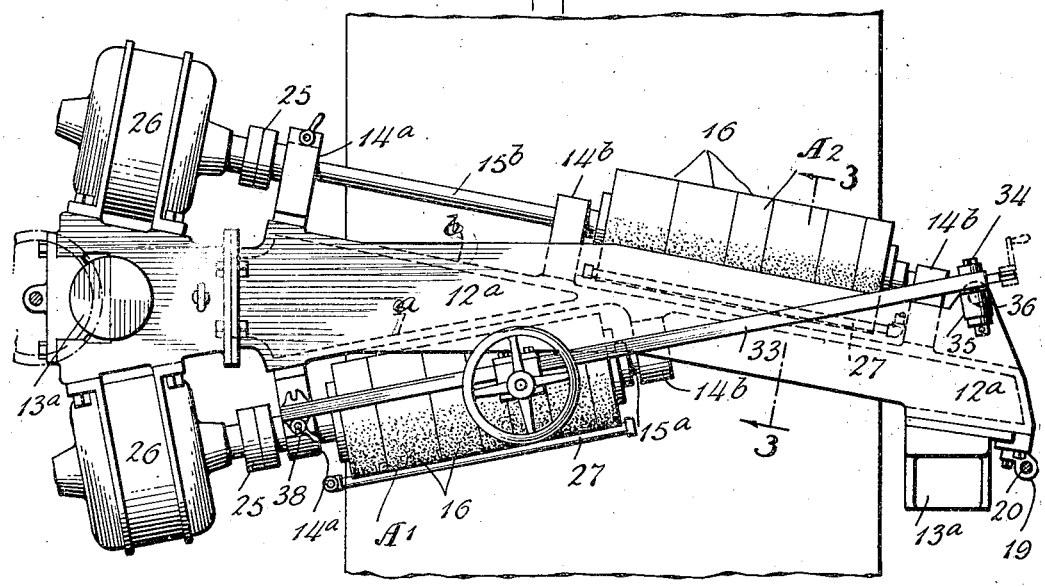
Figure 2:
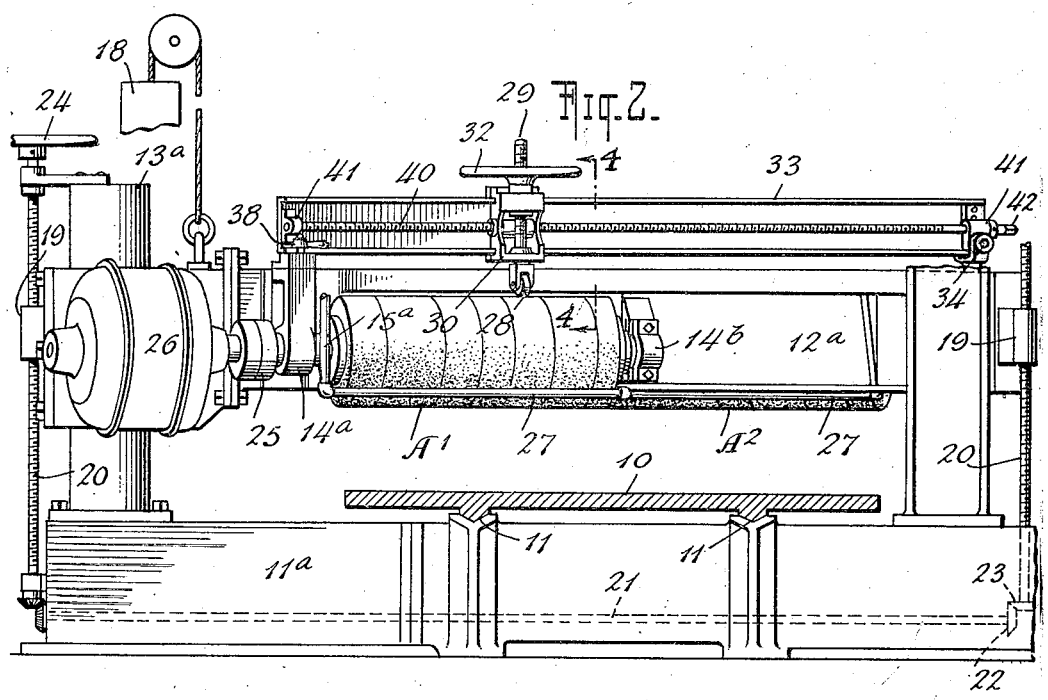

In the drawings, which illustrate several examples of the invention without defining its limits, Fig. 1 is a fragmentary plan view of one form of the invention; Fig. 2 is a front elevation thereof; Fig. 3 is a detail section on the line 3—3 of Fig. 1; Fig. 4 is a detail section on the line 4—4 of Fig. 2, and Fig. 5 is a detail view showing the pivotal mounting of a dressing tool included in the machine.

In the form illustrated in Figs. 1–5, the machine includes the customary table 10 arranged to support the work and to travel lengthwise on rails 11 forming part of the base $11^a$ or equivalent support. A cross-rail $12^a$ extends transversely to the table 10 in a plane parallel therewith and is mounted for vertical adjustment upon columns $13^a$ which project upwardly from the base $11^a$. Any suitable mechanism may be provided for effecting the vertical adjustment of the cross-rail $12^a$, the latter being preferably connected with a counterbalancing weight 18 to facilitate such adjustment. For instance, as shown in Figs. 1 and 2, the cross-rail $12^a$ is provided at its opposite ends with blocks 19 in screwthreaded engagement with screwthreaded rods 20 mounted vertically in the machine so as to be capable of being rotated but incapable of lengthwise movement. The rods 20 are operatively connected for concurrent adjustment by means of a counter shaft 21, and bevel gears 22 and 23 mounted respectively on said shaft and said rods as shown in Fig. 2; to facilitate the operation of the rods 20, one or both of them may be provided with a hand wheel 24.

The cross-rail $12^a$ carries two grinding spindles $15^a$ and $15^b$ extending in a common plane parallel to the plane of the table and journalled in bearings $14^a$ and $14^b$, the latter being constructed to permit the ready removal of said spindles in order to enable the grinding rolls A′ and A² to be built upon thereon to the required extent. The grinding rolls A′ and A² as in the form first described may each consist of a plurality of grinding disks or cylinders 16 or both mounted upon the spindles $15^a$ and $15^b$, the latter, in the illustrated example, being directly connected by suitable couplings 25 with electric motors 26 fixed upon the cross-rail $12^a$ and constituting the means whereby the grinding rolls are actuated. The grinding rolls A′ and A² are so arranged that at their opposed inner ends they overlap each other and so that their axes of rotation are horizontally inclined relatively to the path of travel of the table 10. In the preferred construction, the spindles $15^a$ and $15^b$ are horizontally inclined in opposite directions so that the axes of the grinding rolls A′ and A² cross each other; in such case the bearings $14^a$ are secured upon webs $a$ and $b$ forming part of the cross-rail $12^a$ and projecting at opposite inclinations as shown by dotted lines in Fig. 1.

The machine further includes spraying means 27 for supplying water to the grinding rolls A′ and A², said spraying means being of any conventional form and preferably consisting of two units each located in close proximity to one of the rolls A′ and A² as diagrammatically illustrated in Fig. 1.

To still further increase the efficiency of the machine, means is provided thereon for maintaining the active surfaces of the rolls A′ and A² in a condition of maximum operative efficiency. In the illustrated example, this means comprises a dressing tool consisting of a relatively small roller 28 of suitable material for dressing the rolls A' and A². The roller 28 is journalled in the forked end of an upright stem 29 mounted in a supporting carriage 30 so as to be vertically adjustable relatively thereto; the stem 29 is held against rotation on its axis by means of a spline 31 slidably fitted in a key-slot with which the carriage 30 is provided. At its upper end the stem 29 is screwthreaded for the accommodation of a hand wheel 32, whereby the vertical adjustment of the dressing roller 28 is effected. The carriage 30 is slidably mounted upon a supporting rail 33 pivotally connected at its one end by means of a horizontal pivot 34 with a bracket 35 which itself is pivotally connected by means of a vertical pivot 36 with the cross-rail 12ª, as shown in Figs. 1, 2 and 5. The opposite end of the rail 33 in the two operative positions it is intended to assume, rests upon supports 37, suitable locking means 38 being provided for temporarily fixing said rail 33 in its two extreme positions. The arrangement is such that by lifting the rail 33 on its horizontal pivot 34 high enough to clear the cross-rail 12ª, said rail 33 may be adjusted on its vertical pivot 36 into registry with the rolls A' and A², and the dressing tool 28 will thereby be shifted into operative relation to either of said rolls. The proper engagement between the dressing tool 28 and the surfaces of the rolls A' and A² is effected by operating the hand wheel 32 to shift the rod 29 and with it the roller 28 in vertical directions. Once adjusted, the relationship between the roller 28 and either of the rolls A' and A² is fixed until a new adjustment is had, and the path of the roller 28 lengthwise of said rolls is along a predetermined, constant line. This is due to the fact that the supports 37 so arranged and located that the free end of the rail 33, in both of its extreme operative positions, is supported over the rolls A' and A² at exactly the same height; as a result the rail 33 provides a fixed track for the carriage 30 which in turn carries the roller 28 over a fixed path. The dressing effect of the roller 28 upon the rolls A' and A² accordingly is uniform throughout the surface extent of said rolls.

In order to shift the roller 28 lengthwise of the rolls A' and A² in a predetermined manner and at a constant speed, the carriage 30 is provided with an internally screwthreaded boss 39 in screwthreaded engagement with a threaded shaft 40. The latter is rotatably mounted in bearings 41 secured on the rail 33 and is fixed against movement in the direction of its length relatively to said rail. At its one end the shaft 40 is squared as indicated at 42 for the accommoration of a crank-handle whereby said shaft 40 may be manually rotated; preferably, however, provision is made for automatically operating the shaft 40 by power in order that the travel of the roller 38 lengthwise of the rolls A' and A² may be uninterrupted and thereby avoid the formation of ridges in said rolls. As rotation of the shaft 40 takes place, the screwthreaded engagement between the boss 39 and the shaft 40 will cause the carriage 30 to travel lengthwise of the rail 33 and the roller 28 to move lengthwise of the roll A' or A² as the case may be. As the latter is at the same time being rotated, all parts of the surface thereof will receive treatment whereby said surface is easily maintained in a condition of maximum efficiency.

The machine of Figs. 1 and 2 possesses material advantages over existent types of stone treating machines and by providing two independent grinding rolls, enables the length of the machine to be reduced without affecting the grinding efficiency thereof. By removing sections 16 from the rolls A' and A², the operative length thereof may be adjusted to any desired dimension within the range of the machine; this removal of sections 16 takes place from the outer ends of the rolls toward the inner ends in order not to disturb the overlapping relation of said inner ends. Those sections 16 which are removed are replaced by suitable filling pieces whereby the remaining sections 16 of each roll are securely fixed in place on the respective spindles 15ª and 15ᵇ.

While the arrangement illustrated in Figs. 1 and 2 is preferred, it will be understood that the spindles 15ª and 15ᵇ may be located in other relations to each other as long as the overlapping arrangement at the inner ends of the grinding rolls and the horizontal inclination thereof relatively to the path of travel of the work or to the equivalent of said travel is preserved.

By locating the rolls A' and A² at the inclinations indicated in Fig. 1, the water from the spraying units 27 will be caused to flow over the surface of the stone being treated toward the outsides and accordingly will carry the products of the grinding operation away from and out of the grinding path of the rollers. The latter are thereby enabled to perform their functions in an efficient manner at all times.

By locating the dressing tool 28 and its associated parts above the grinding rolls, these elements are readily accessible for purposes of adjustment and replacement as may become necessary.

Various changes in the specific form shown and described may be made within the scope of the claims without departing from the spirit of the invention.

I claim:

1. In a rubbing machine, the combination of a support for the work, a second support extending transversely thereto, one of said supports being movable relatively to the other over a linear path, a pair of independent rotatable grinding rolls on said second support having their inner ends in contiguous overlapping relation in approximate registry with the longitudinal median line of said work support and having their axes of rotation inclined across said path in a plane parallel therewith in opposite oblique directions extending toward a given end of the machine.

2. In a rubbing machine, the combination of a support for the work, a second support extending transversely thereto and vertically movable relatively to said work support, one of said supports being movable relatively to the other over a horizontal path, a pair of independent rotatable grinding rolls on said vertically movable support having their inner ends in contiguous overlapping relation in approximate registry with the longitudinal median line of said work support and having their axes of rotation inclined across said path in a plane parallel therewith in opposite oblique directions extending toward a given end of the machine.

3. In a rubbing machine, the combination of a travelling table for the work, a cross-rail extending transversely above said table, and vertically movable with respect thereto, a pair of independent grinding rolls rotatably mounted on said cross-rail and vertically movable therewith, said rolls having their inner ends in contiguous overlapping relation in approximate registry with the longitudinal median line of said travelling table and having their axes of rotation inclined across the path of travel of said table in a plane parallel thereto in oblique directions extending toward a given end of the machine, and means on said cross-rail vertically movable therewith for operating said rolls.

4. In a rubbing machine, the combination of a travelling table for the work, a cross-rail extending transversely above said table, and vertically movable with respect thereto, a pair of independent grinding rolls rotatably mounted on said cross-rail and vertically movable therewith, said rolls having their inner ends in contiguous overlapping relation in approximate registry with the longitudinal median line of said travelling table and having their axes of rotation inclined across the path of travel of said table in a plane parallel thereto in oblique directions extending toward a given end of the machine, and independent motors mounted on said cross-rail and vertically movable therewith for independently operating said rolls.

5. In a rubbing machine, the combination of a travelling table for the work, a cross-rail extending transversely above said table, a pair of independent grinding rolls rotatably mounted on said cross-rail and having their axes of rotation inclined across the path of travel of said table in a plane parallel thereto and in directions crossing each other, a dressing tool movable into corresponding operative relation with either of said rolls, and means for shifting said dressing tool lengthwise of the roll upon which it is operating.

6. In a rubbing machine, the combination of a travelling table for the work, a cross-rail extending transversely above said table, a pair of independent grinding rolls rotatably mounted on said cross-rail and having their axes of rotation inclined across the path of travel of said table in a plane parallel thereto and in directions crossing each other, a bracket pivoted to said cross-rail about a vertical axis, in registry with the point of intersection of the axes of said rolls, a supporting rail pivoted at one end to said bracket about a horizontal axis and movable on the vertical axis into registry with one or the other of said rolls, supporting means whereby the other end of said rail is supported at the same height in independent operative relation to said grinding rolls, a carriage slidably mounted on said supporting rail, a dressing tool mounted on said carriage and vertically adjustable thereon, and means for moving said carriage along said supporting rail to shift said dressing tool lengthwise of one or the other of said rolls.

In testimony whereof I have hereunto set my hand.

JULIUS WEGNER.